United States Patent [19]
Tanefsky et al.

[11] Patent Number: 5,175,571
[45] Date of Patent: Dec. 29, 1992

[54] GLASSES WITH SUBLIMINAL MESSAGE

[76] Inventors: Faye Tanefsky, 2 Ravenrock Court; Michael R. McCaughey, 25 Ravenrock Court, both of Don Mills, Ontario, Canada, M3A 2Y8

[21] Appl. No.: 640,224

[22] Filed: Jan. 11, 1991

[30] Foreign Application Priority Data

Jan. 11, 1990 [CA] Canada ................................. 2007611

[51] Int. Cl.⁵ ............................................. G02C 1/00
[52] U.S. Cl. ...................................... 351/158; 351/49
[58] Field of Search ....................... 351/41, 47, 45, 46, 351/158

[56] References Cited

U.S. PATENT DOCUMENTS

| | | | |
|---|---|---|---|
| 3,597,054 | 8/1971 | Winter | 351/158 |
| 4,163,607 | 8/1979 | Nannini | 351/47 |
| 4,329,378 | 5/1982 | Tarumi et al. | 351/165 |
| 4,338,004 | 7/1982 | Visper | 351/47 |
| 4,414,431 | 11/1983 | McCartney | 351/47 |
| 4,715,702 | 12/1987 | Dillon | 351/44 |
| 4,938,582 | 7/1990 | Leslie | 351/158 |

Primary Examiner—Paul M. Dzierzynski

[57] ABSTRACT

A pair of subliminal imaging spectacles is provided with a matched pair of visual subliminal images designed and placed so as to merge into one image due to the stereoscopic effect of human vision and thus to impart a subliminal message to the wearer.

7 Claims, 2 Drawing Sheets

GLASSES WITH SUBLIMINAL MESSAGE

FIELD OF THE INVENTION

The present invention relates to an individual, personal, subliminal message device, and in particular, to a pair of subliminal imaging spectacles.

BACKGROUND OF THE INVENTION

It is well known that techniques such as auto-suggestion, can have significant results in producing character and behaviour improvement. Such techniques are known by a variety of different names, but generally involve the use of some form of message, usually incorporating positive reinforcement statements, which are tape recorded, and may be played by a listener several times a day. In some cases, the message is an audible message and, in other cases, the message is a subliminal message recorded over background sounds, which may be classical music, abstract sounds, or noise such as that of breaking waves. These techniques, using subliminal messages on tapes have also been promoted as an aid to learning.

Other techniques for self-improvement or behaviour modification, involve so-called "visualizations" in which the person is taught to visualize himself in an improved or altered state.

All of these techniques have their followings, and many persons have used them all, often with startling improvement. Such techniques have been promoted, for example, as a treatment for substance abuse such as the abuse of tobacco, alcohol and even drugs. Such techniques are also said to produce character changes such as to produce greater success in business or in personal relationships or in sports.

These techniques have, however, certain limitations. Thus, the use of taped messages whether audible or subliminal require that some time be set aside while the tape is played. This is true whether the tapes are those promoted for use while sleeping, or tapes promoted for use while in a relaxed, semi-trance like state or the like, or even while walking, or driving in an automobile.

It is difficult for such systems to be used while the subject is engaged in some other activity, or is involved in a conversation.

It is now believed that in fact, similar if not better results can be obtained from subliminal-type suggestion, to which the subject is exposed more or less on a continuous basis even while he is engaged in other activities. In this way, the suggestion will be constant, and continuous throughout the day, or even while sleeping.

Clearly, the subliminal suggestion must enter the mind through one of the senses. Most audible or subliminal verbal suggestions cannot be delivered on a continuous basis to the subject, while he or she is engaged in other activities such as working, or while engaged in a sport.

In accordance with the present invention, it is proposed to deliver such subliminal messages as visual messages in such a way that, while the message is continuously in front of the eyes of the subject, the subject is not conscious of the existence or presence of the message, and can continue whatever activities he or she is engaged in without interference or distraction.

BRIEF SUMMARY OF THE INVENTION

With a view to achieving the general objectives set out above, the invention comprises a pair of subliminal imaging spectacles adapted to be worn on the head, in front of the eyes, and comprising a pair of lenses adapted to be located in front of the eyes of the wearer, and a pair of subliminal message on said respective ones of said pair of lenses, said message covering a predetermined area in front of each eye, and located upwardly of the normal line of sight and spaced apart a predetermined distance whereby to take advantage of the stereoscopic effect of human vision thereby effectively causing said two images to merge as one.

More particularly, it is an objective of the invention to provide a device having the foregoing advantages wherein said glasses comprise sunglasses having tinted lenses.

More particularly, it is an objective of the invention to provide a device having the foregoing advantages wherein said message means are printed on a transparent medium, and adhesively bonded to a pair of lenses.

It is a further and related objective of the invention to provide such a device wherein said message images are printed directly on.

The use of the word glasses or spectacles herein is used herein to include all means of supporting the subliminal images in front of each eye above the actual line of sight and spaced apart a predetermined distance whereby to take advantage of the stereoscopic effect of human vision thereby effectively causing said two images to merge as one.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

DESCRIPTION OF A SPECIFIC EMBODIMENT

Figure 1:
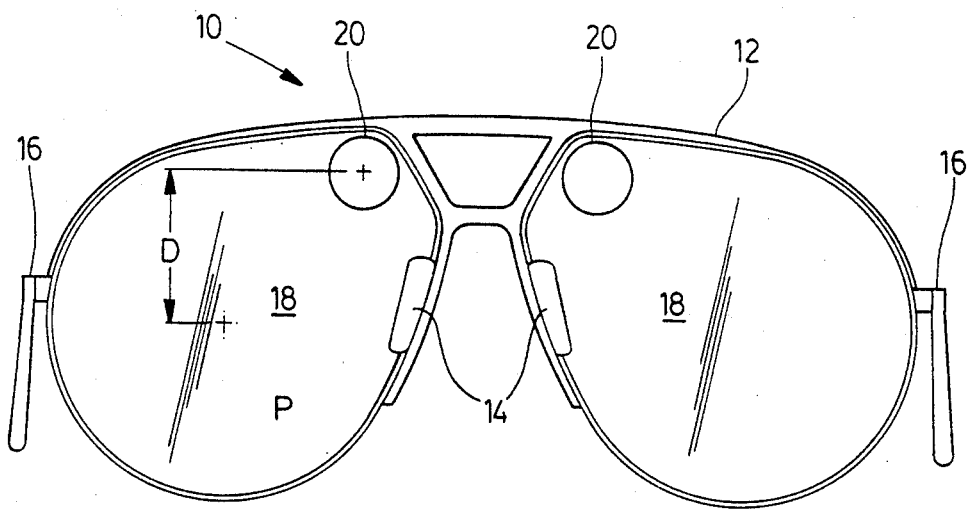
FIG. 1 is a perspective illustration showing one embodiment of the invention in the form of a pair of glasses.
Figure 2:
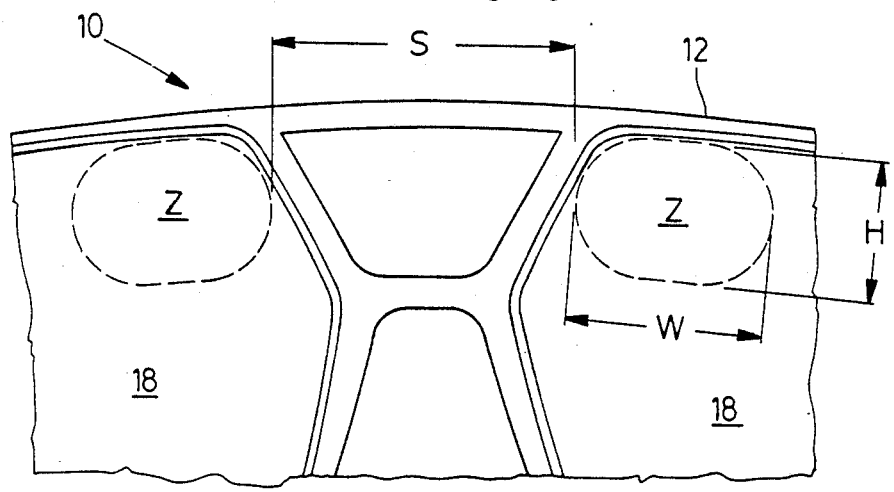
FIG. 2 is a schematic elevational view greatly enlarged showing the location of the message images; and the area of permissible location, and the visual merging of the two images, in use, resulting from such placement.

Referring to FIGS. 1 and 2, the invention is there illustrated in the form of a pair of glasses indicated as 10, having conventional frames 12, nose pieces 14, and arms 16 adapted to be looped over the ears in the usual way. Lenses 18 are provided, being either of glass or plastic material, and the glasses may, of course, be prescription glasses, or may simply be sunglasses.

In the preferred form of the invention, the lenses are tinted for reasons to be described below, but the invention is equally applicable to transparent lenses, whether of plain glass or plain plastic, or of prescription glass.

In accordance with the invention, message images indicated as 20-20 are supported on the respective lenses, which function as supports, for supporting the message images. Each of the message 20-20 are identical to each other, and preferably comprise a simple graphic message. For example, for smokers trying to quit the habit, the message would typically be a cigarette, shown in combination with a highway stop-sign i.e. a circle with diagonal line traversing the cigarette. For alcohol, the equivalent sign might be such a highway stop-sign traversing a bottle or a glass.

On the other hand, for persons with a personality problem such as an inferiority complex or a persecution complex, the graphics might simply be a single face, with a happy smile. Any wording incorporated in the message will usually be minimal at most.

In accordance with the invention, the message images will be located in a predetermined, defined area on each of the lenses. This area is indicated in phantom as the zone Z, in each of the lenses shown in FIG. 2. This area is located above the normal line of sight of the wearer, and is closely adjacent to the bridge of the nose, and is spaced equidistant on either side. This zone Z has a height dimension H, and width dimension W, and the two zones are spaced apart a distance S. Typically, these dimensions will be in the following range.

Height—H = between about 8 and 16 mm.
Width—W = between about 8 and 22 mm.
Spacing—S = between about 20 and 28 mm.

Assuming the line of sight of the typical subject or wearer of the glasses is more or less central of the lenses, as indicated by the point P in FIG. 1, then the zone Z will be located with its lower periphery at a distance D above the centre of the lens, where D = between about 12 and 20 mm.

Figure 5A:
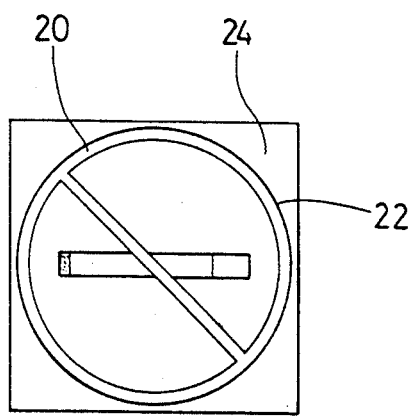
Figure 5B:
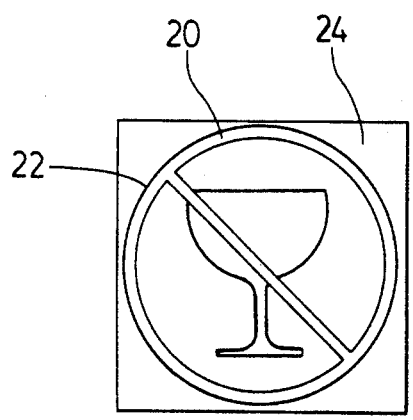
Figure 5C:
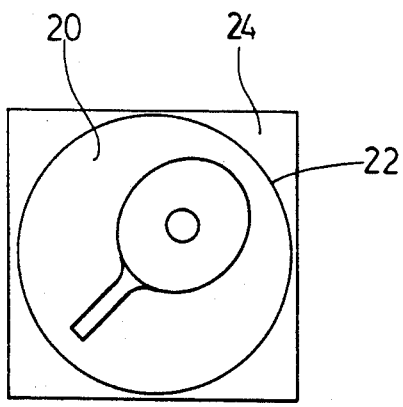
Figure 5D:
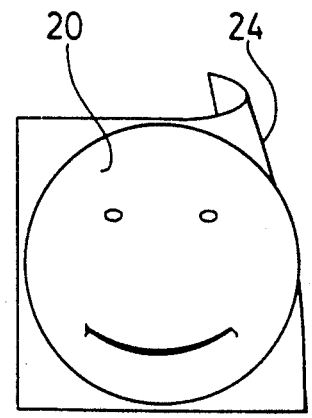

As shown in FIGS. 5a, 5b, 5c and 5d in one preferred embodiment, the message images 20-20 may be provided by means of discs 22 of transparent material typically a synthetic plastic material such as "Mylar" (Trademark) or the like. Such discs 22 will be printed with the appropriate message, and will have an adhesive coating on one side, and will be removeably mounted on a backing panel 24. They may then be peeled off panel 24 as shown in FIG. 5d and adhesively bonded to the inside surface of the lenses of the glasses in the appropriate location on either lens. In this way, it is possible to preprint a variety of different messages on different discs 22. Discs 22 mounted on backing panels 24 may then be supplied to purchasers for their own use. Alternatively, purchasers may purchase a pair of glasses, to which the discs will first of all have been applied.

In accordance with another embodiment of the invention, the message means may simply be printed directly on the inside surface of each lens.

In the preferred case, the lenses of the glasses are tinted, so that the message images are concealed, or at least less obtrusive, and will not be apparent to persons other than the subject.

In operation, the subject will simply place the glasses on the bridge of the nose in the usual way, and wear them during whatever activity he wishes to undertake, whether it is work, recreation, a meeting, a meal, sports or even watching television, a movie or the like.

From experience, it has been found that when the glasses are first put on, the subject will notice the message images, momentarily. The message means will appear merged as a single image, focussed more or less centrally between the two eyes. After a few seconds, for example, ten to twenty seconds in the average case, the subject is no longer conscious of the image and the image essentially disappears.

It is not understood precisely why the image is first of all perceived, and then disappears. However, various observers have had the same experience, and there is no doubt that it occurs.

However, in spite of the fact that the subject is no longer conscious of the message so that it is not actually perceived consciously, it nevertheless appears to be present in the sub-conscious mind of the subject. For example, subjects wishing to treat a dependence on tobacco, find that while they are wearing glasses incorporating a tobacco message e.g. a highway stop-sign intersecting a cigarette, that they lose the urge to smoke. It is not understood whether in fact this is due to a subliminal suggestion being received in the sub-conscious mind, or whether in fact it is some form of psychosomatic or "placebo" effect resulting from knowingly wearing glasses containing the message images. However, it is believed that the nature of the explanation for the results obtained is irrelevant. If results are obtains, they are obtained, for whatever reason. It is simply a case of the end justifying the means. Assuming the end is a desirable one such as the treatment of substance abuse, the improvement of behaviour or personality, then the means, in this case being a totally non-invasive and harmless method, is fully justified. Even if such treatment must be continued indefinitely, no harm can possibly result, and assuming the treatment is successful, very substantial benefits will be enjoyed by the subject.

If for some reason the subject is resistant to the message, then no ill effects have been suffered, and the cost has been minimal.

Figure 3:
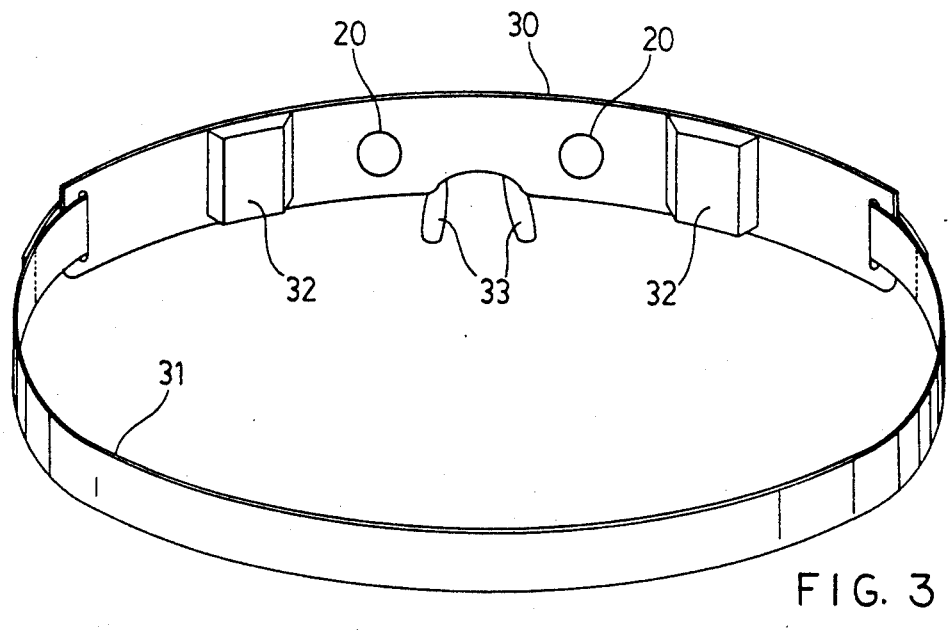
FIG. 3 shows an alternate embodiment of the invention, for use by persons not requiring glasses, such as person wearing contact lenses, or a person engaged in a sport or other activity.

A further embodiment of the invention is illustrated in FIG. 3. In this case, it is assumed that the subject does not require the wearing of glasses, and does not wish to wear non-prescription sunglasses for extended lengths of time, in order to enjoy the benefits of the invention. Alternatively, the subject may prefer to wear contact lenses, and wishes to enjoy the benefits of the invention while engaged in some activity such as, for example, a sport. This may be true of a person enjoying various sporting activities such as for example, squash, golf, tennis, skiing or the like. In these sports, it is well known that auto-suggestion, visualization and other forms of personality or behaviour modification, can for certain subjects be highly successful in improving the subject's performance in those sports. Persons involved in these sports obviously may not wish to wear a pair of glasses incorporating the message images in accordance with the invention. Persons involved in skiing may, for example, wish to wear a typical pair of ski goggles incorporating the message images. Persons involved in other sports such as tennis, golf, squash and the like may not wish to wear any form of glasses or goggles.

In this case, they may wish to wear a modified form of the invention, in which there is not obstruction to the normal line of sight.

In this form of the invention, the visual image support means comprises a transparent panel 30 which may or may not be tinted and which is located on the head above the normal line of sight. The panel 30 may be retained in position on the head by means for example, of an elastic headband 31. Pads 32 and nose pieces 33 assist in locating the panel 30 in front of the eyes but above the normal line of sight. Message images 20-20 may be located at the appropriate locations, as described in connection with FIG. 2, on the transparent panel 30. The message contained by the message images may be any desired message. For example, if the subject is engaged in a sport, then the message may be appropriate for the particular sport. For example, in the case of tennis, the message may simply be an image of a tennis racket showing the tennis ball impinging on the centre of the racket. A similar message may be used with other raquet sports. In the case of golf, the message may be the flight of the ball, or an image of a perfect swing, or may be an image of a ball perfectly centred on the fact of the golf club.

In this embodiment of the invention, the subject may simply wear the headband with the transparent panel throughout the entire game. Since the transparent panel does not interfere with the normal line of sight, it will not interfere with the subject's enjoyment of the game.

Figure 4:
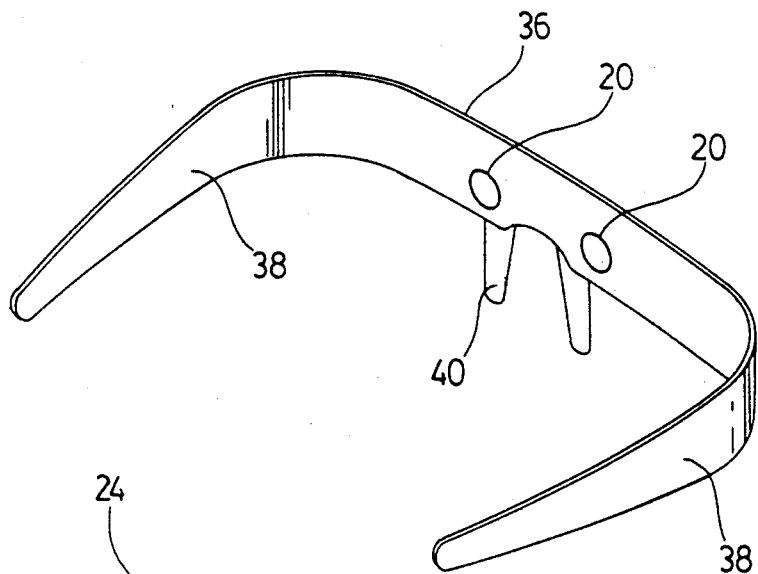
FIG. 4 shows a further alternate embodiment of the invention, for use by persons not wearing glasses at the time, and, FIGS. 5a, 5b, 5c and 5d are illustrations showing image devices prior to attachment to the glasses, in one embodiment of the invention.

In accordance with a further alternate embodiment of the invention, where the subject does not wish, or choose, to wear glasses, and does not wish to wear a head band encircling the head, then, as shown in FIG. 4, a transparent panel 36 having curved side arms 38 adapted to lie over the ears. Panel 36 may be shaped so as to be supported on the bridge of the nose or may have a nose pieces 40. The support 36 will carry the appropriate message images 20-20 in the manner described above located in front of the eyes but above the line of sight. In this case, the subject may simply place the device on the bridge of the nose and loop the arms over the ears, and then go about his or her activity.

The foregoing is a description of a preferred embodiment of the invention which is given by way of example only. The invention is not to be taken as limited to any of the specific features as described, but comprehends all such variations thereof as come within the scope of the appended claims.

The embodiments of the invention in which an exclusive property or privilege is claimed are defined as follows:

1. A pair of subliminal imaging spectacles adapted to be worn on the head, in front of the eyes, and comprising:
   a pair of lenses adapted to be located in front of the eyes of the subject,
   and, a pair of subliminal message images on said respective ones of said pair of lenses said message images covering a predetermined area in front of each eye and located upwardly of the normal line of sight, and spaced apart a predetermined distance whereby to take advantage of the stereoscopic effect of human vision thereby effectively causing said two images to merge as one.

2. A pair of subliminal imaging spectacles as claimed in claim 1 wherein said glasses comprise sunglasses having tinted lenses.

3. A pair of subliminal imaging spectacles as claimed in claim 1, wherein said message means are printed on a transparent medium, and are adhesively bonded to said lenses.

4. A pair of subliminal imaging spectacles as claimed in claim 1 wherein said message images are printed directly on respective ones of said pair of lenses.

5. A pair of subliminal imaging spectacles as claimed in claim 1, wherein said lenses comprise transparent panel means, located above the normal line of sight, suitable for use by persons not requiring glasses.

6. A pair of subliminal imaging spectacles as claimed in claim 1 including attachment means for attaching said spectacles to the head.

7. A pair of subliminal imaging spectacles as claimed in claim 1 wherein said spectacles include a head band.

* * * * *